3,033,640
INCORPORATION OF AN ORGANIC BASIC COMPOUND INTO CELLULOSE ACETATE MATERIALS

Kurt Hofer, Neue Welt, Munchenstein, Hans Martin Hemmi and Albin Peter, Binningen, and Karl Lutz, Basel, Switzerland, assignors, by mesne assignments, to Saul & Co., Newark, N.J., as nominee of Fidelity Union Trust Company
No Drawing. Filed June 16, 1955, Ser. No. 516,026
Claims priority, application Switzerland June 16, 1954
7 Claims. (Cl. 8—61)

The present invention is concerned with the improvement of the dyeing properties of materials capable of being dyed with acetate dyes.

According to the invention, there is incorporated into the said materials, a basic compound of the formula $$(R'—)_m A(—OR'')_p \quad (I)$$

wherein A represents an aromatic or halogenated aromatic hydrocarbon radical, $R'$ is a hydrogen atom, an alkyl group or an aminoalkyl group, which may be additionally substituted, and $R''$ is likewise a hydrogen atom, an alkyl group or an aminoalkyl group, which may be further substituted, each of $m$ and $p$ represents one of the integers 1 or 2, and wherein at least one of the radicals $R'$ and $R''$ must represent aminoalkyl or substituted aminoalkyl. Instead of incorporating such compounds into the material, the compounds may be applied to the surface thereof.

The compounds of Formula I, supra, comprise, for example, the following subgroups:

1. Hydroxy aromatic compounds which contain a nuclearly-bound aminoalkyl group, which may be substituted and in which the amino group is connected to the aromatic nucleus by way of a methylene group in ortho- or para-position to a nuclear hydroxyl group.

These compounds can be prepared according to the Mannich reaction (see "Organic Reactions," Roger Adams, editor-in-chief, Wiley, New York, 1942, vol. I, page 303 et seq.), from aromatic hydroxy compounds of the formula $$(R'—)_m A(—OH)_p$$

wherein $R'$, A, $m$ and $p$ have the previously indicated significances.

(2) Organic bases of the formula

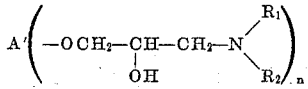

wherein $A'$ represents an aromatic hydrocarbon radical, which may be alkylated or halogenated, $n$ is one of the integers 1 or 2, $R_1$ stands for a hydrogen atom or an alkyl, hydroxyalkyl, cyanoalkyl, cycloalkyl or aralkyl group, $R_2$ is a hydrogen atom or an alkyl, alkoxy, cyanoalkyl, cycloalkyl or aralkyl group, and wherein $R_1$ and $R_2$ may form a ring.

Bases of this type can for example be prepared from epoxides of the formula

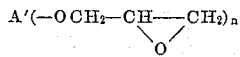

by reaction with amines of the formula

wherein $A'$, $R_1$ and $R_2$ and the subscript $n$ have the previously-recited significances.

The said epoxides can be prepared from the corresponding hydroxy aromatic compounds by reaction thereof with glycerol epihalogenides such as epichlorhydrin, in the presence of alkaline agents which are capable of splitting off hydrohalic acids.

Illustrative of materials capable of being dyed with acetate dyes are, more particularly, cellulose esters such as cellulose acetate, polyamides such as nylon and Perlon, polyesters such as Terylene, cyanoethylated cellulose, etc.

The enhanced dyeing capacity produced with the aid of the aforesaid basic compounds is largely resistant to rinsing and washing. The dyeing behavior (reserving capacity) of acetate silk for direct dyes, which do not dye acetate silk, however, is not influenced.

Particularly suitable epoxides of the said type are, for example, the following:

Phenoxy-propeneoxide,
Ortho-cresoxy-propeneoxide,
Meta-cresoxy-propeneoxide,
Para-cresoxy-propeneoxide,
Mixtures of the said cresoxy-propeneoxides,
Xylenyloxy-propeneoxides,
p-Tertiary-butylphenoxy-propeneoxide,
Halogenated phenoxy-propeneoxides,
Halogenated cresoxy-propeneoxides,
Halogenated xyleneyloxy-propeneoxides,
Naphthoxy-propeneoxides,
Bis-propeneoxides of resorcinol, of 2,2'-bis-hydroxyphenyl-propane, and of p-di-(hydroxy diphenyl)-methane, etc.

Particularly suitable amines of the aforementioned type, are for example, the following: alkylamines such as methylamine, dimethylamine, butylamine, cyclohexylamine, phenylethylamine, benzylamine; hydroxy amines such as monoethanolamine, diethanolamine, monoisopropanolamine, di-isopropanolamine, butanolamine, methyl-monoethanolamine, butyl-monoethanolamine, cyclohexyl-monoethanolamine, cyanoethylamine, cyanoethylhydroxyethylamine, dicyanoethylamine, 2-aminopropanol-1, morpholine, 3-methoxypropylamine, 3-isopropoxypropylamine, toluidine, etc.

At room temperature (20–30°), the said bases are oily to semi-solid. They are soluble in acids and in organic solvents. They are generally insufficiently soluble in water so that before being employed, for example in dyeing, they are preferably dissolved in water-soluble organic solvents such as alcohol (ethanol) and then emulsified in the dyebath, to which has been added a dispersing agent such as soap, an alkylarylsulfonate, a fatty acid condensation product, a sulfonated fatty oil or a sulfated oil, an alkyl polyglycolether, an alkylaryl polyglycol ether, etc. Preferably the base is added to the dyebath or—in printing—to the printing paste so that it draws onto the material being treated, simultaneously with the dyestuff. However, the treatment can also be carried out prior to or, if desired, after the dyeing or printing operation, or the base can be added to the material prior to spinning or casting.

According to one embodiment of the invention, the base is mixed with the dispersing agent and is then dispersed in the treating bath or in the printing paste. However, any other appropriate process may also be employed, such as spraying of a dilute solution of the base in a volatile solvent. In all cases, the base penetrates into the material being treated and improves the dyeing properties thereof in the sense that it protects the already-obtained or subsequently-prepared dyeing against the action of gas fumes, so-called gas fading.

The present invention also relates to the production, by means of acid dyestuffs, of light-fast and wash-fast dyeings on articles made of cellulose derivatives, especially cellulose acetates which contain 2 to 3 acetyl groups per glucopyranose radical, and cyanoethylated celluloses, To this end, an aromatic compound, as above defined, or a mixture of several of such compounds, if desired in the form of an acetone solution, is added, for example, to a spinning mass consisting of a cellulose ester and acetone. After thoroughly admixing the mass, spinning can be carried out in conventional manner. According to another embodiment of this phase of the invention, the finished article can be treated with an aqueous suspension of a compound, as above defined or an aqueous solution of a salt of such a compound, or of an aqueous suspension or solution of a mixture of several of such compounds or salts, or with a solution thereof in an organic solvent, such, for example, as acetone. The so-obtained or so-treated articles are dyed with acid dyestuffs. The dyeing is advantageously carried out in an acid bath, e.g. a bath rendered acid with acetic acid, formic acid or sulfuric acid, at a relatively low temperature, for example at 70–80° C.

A particularly simple embodiment of the last-mentioned process consists in carrying out the treatment of the article made of cellulose derivative with the compound, as above-defined, simultaneously with the dyeing of such article and in the same bath.

Acid dyestuffs which are particularly suitable for the purposes of this invention are the simple acid azo dyestuffs and the monosulfonated acid anthraquinone dyestuffs.

The so-obtained dyeings are characterized by surprisingly good fastness to light and to washing. Even those dyestuffs which produce wool dyeings of only slight fastness to light, here yield dyeings of very good fastness to light. The dyeings are in general also fast to gas fumes.

The following examples illustrate the invention without, however, being limitative thereof. In such examples, the parts are parts by weight, the percentages are percentages by weight, and the temperatures are in degrees centigrade.

*Example 1*

An acetate satin is dyed for 1 to 3 hours in a dyebath in a liquor-to-goods ratio of 40:1, the said bath containing, per liter, 0.5 gram of Artisil Direct Violet 2RP (Text. Ber. 1930, 11, 311, Dtsche. Färber-Zeitung, 1930, 66, 12), 2 grams of Marseilles soap with a 72% fat content and, in addition, 1.5 grams of the compound of the formula

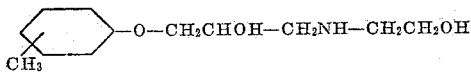

in dispersed form. In order that the said compound may be dispersed in the bath, it is preliminarily dissolved in 3 parts of warm alcohol (ethanol). The so-obtained dyeing is rinsed and dried. The product is a level dyeing which even after being washed at 50° with water containing 5 grams of Marseilles soap per liter, shows an excellent resistance to nitrous gases. Similar results are obtained when, instead of the above mentioned compound, a compound of the formula

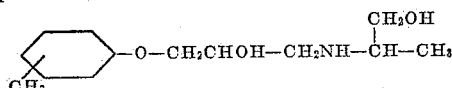

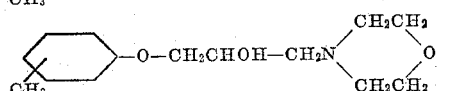

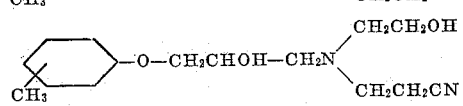

or

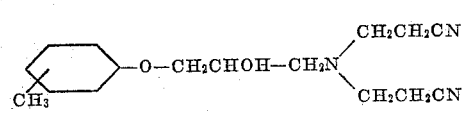

is employed; in these compounds the methyl group on the phenol nucleus may be in ortho-, meta- or para-position relative to the ether group. Mixtures of the said compounds, obtained from different isomeric cresols, may also be employed.

The starting compound of the formula

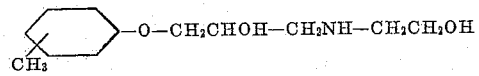

can be prepared as follows:

One mol of cresoxy-propeneoxide is added drop-wise at 100° in the course of 2 hours to one mol of monoethanolamine. The mixture is then heated to 120° for 4 hours. There is obtained a viscous, clear, weakly brownish oil of the last-indicated formula, which oil is only poorly soluble in water but is of good solubility in dilute formic acid or acetic acid.

The other basic compounds of the invention cited in this example and in the further examples, except those cited in the Examples 14, 18 and 23, can be analogously prepared. The bases specified in the Examples 14, 18 and 23 can be prepared as disclosed in column 1, lines 38 to 58, inclusive.

*Example 2*

Acetate silk is dyed in a goods-to-liquor ratio of 1:40 in a dyebath which contains, per liter, 0.44 gram of Artisil Direct Red 3BP (Schultz, Farbstofftabellen, Erg. Band I, 1934, p. 69, und Band II, 1932, p. 21), 2.5 grams of 50% sodium oleyl methylaminoethylsulfonate and, in addition, 1.25 grams of the compound of the formula

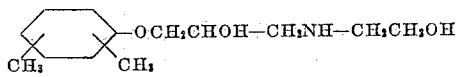

in dispersed form. The dispersion is produced by stirring a 30% alcoholic (ethanolic) solution of the basic compound into the dyebath. The finished dyeing shows good fastness to gas fumes.

If the compound of the preceding formula is replaced by the corresponding quantity of the β-naphthyl ether of the formula

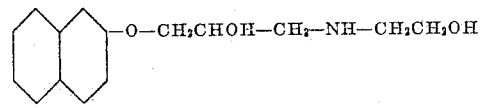

a dyeing is obtained which also has a good fastness to gas fumes.

*Example 3*

Acetate silk is dyed in a goods-to-liquor ratio of 1:40 in a dyebath which contains, per liter, 0.5% of Artisil Direct Blue 2RP (Schultz, Farbstofftabellen, Erg. Band I, 1934, p. 69), 2 grams of Marseilles soap (72%) and, in addition, 1.3 grams of the compound of the formula

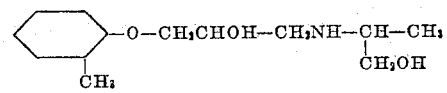

in dispersed form, the dispersion being prepared after the manner described in Example 2 with the aid of alcohol (ethanol). The obtained dyeing is very fast to gas fumes, even after being washed at 55° in a bath containing only soap or soap and sodium carbonate.

If the aforesaid compound is replaced by the same quantity of any one of the compounds of the following formulae

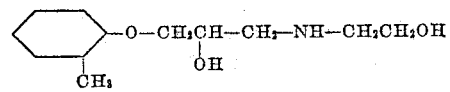

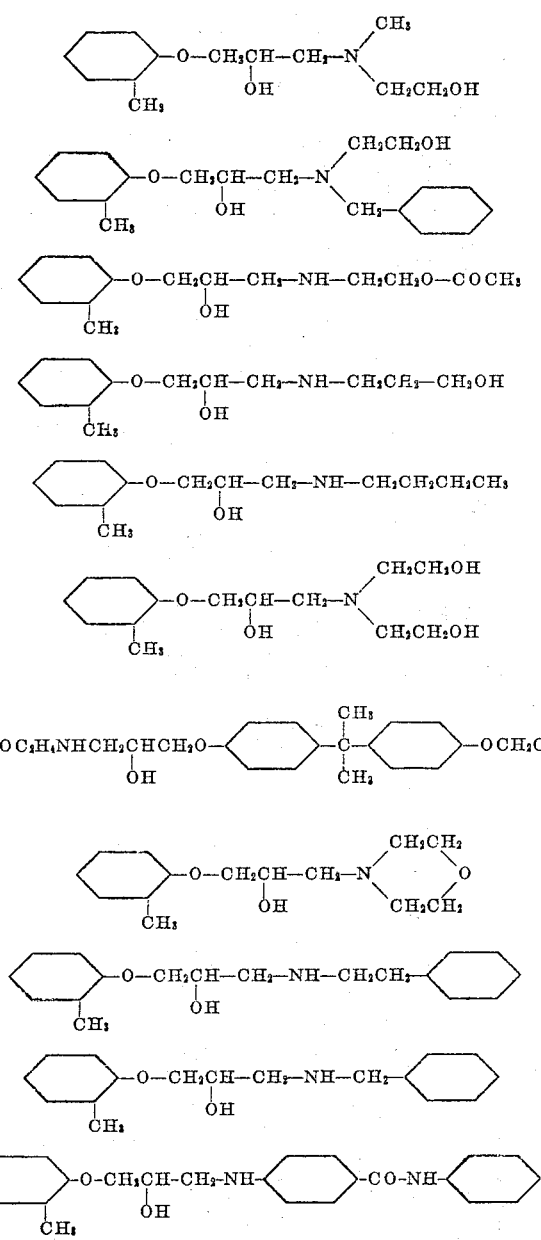

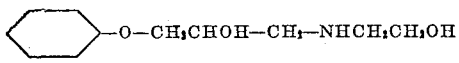

or of isomers of these compounds derived from m- or p-cresol, dyeings which are fast to gas fumes are likewise obtained. Similar results are also obtained when the dyeing is carried out in the absence of the said bases, if the dyeings are aftertreated at 40° in a bath which contains one of the bases in dispersed form.

*Example 4*

A desized and pre-bleached acetate satin is dyed in a goods-to-liquor ratio of 1:40 in a dyebath which contains, per liter, 0.3 gram of Artisil Direct Blue SAP (Schultz, Farbstogtabellen, Erg. Band I, 1934, p. 69), 2 grams of Marseilles soap (70%) and 2 grams of the compound of the formula

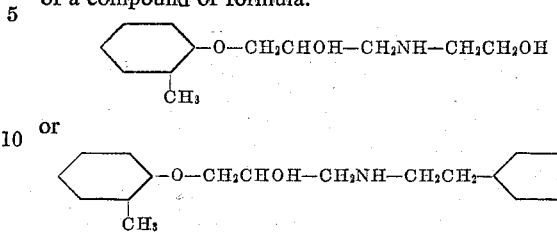

in dispersed form. The resultant dyeing is fast to gas fumes even after being washed.

Dyeings with similar fastness to gas fumes are obtained when the aforementioned compound is replaced by compounds which are analogously derived from halogenated phenols, e.g. 2,4-dichloro-phenol, or 4-bromo-phenol, or chlorinated cresols.

*Example 5*

To a 10% solution of cellulose acetate in 50% acetone, there is added 6%, relative to the cellulose acetate, of a compound of formula.

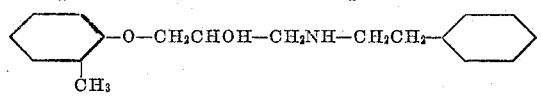

or

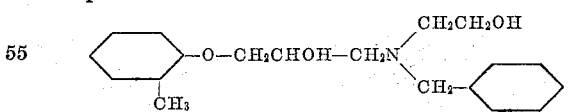

and the resultant solution is spun in the manner employed for the preparation of acetate silk. The so-obtained undyed silk does not turn yellow upon exposure to light and can be dyed with acetate dyestuffs to yield dyeings which are fast to gas fumes. It is not dyed more strongly by direct dyestuffs than is ordinary inhibitor-free acetate silk. The protective action against gas fumes is retained even after washing. The light-fastness of the dyeings is not affected by the said inhibitors.

*Example 6*

An acetate satin is pre-treated at 80° in a goods-to-liquor ratio of 1:40 for 30 minutes in a bath which contains, per liter, 2 grams of the compound of the formula

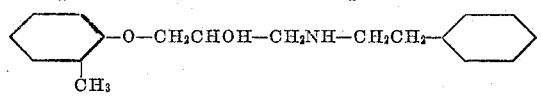

and, as dispersing agent for the said base, 2 grams of lauryl-hexylglycol ether. In order to facilitate dispersion, the base is first dissolved in 4 parts of warm alcohol (ethanol). The material is then rinsed and dried. If the so-pre-treated acetate silk is dyed with 1.5% of Artisil Direct Blue 2RP, a dyeing which is fast to gas fumes is obtained.

*Example 7*

Acetate silk which has been dyed with 1.8% of Artisil Direct Blue SAP (Schultz, Farbstofftabellen, Erg. Band I, 1934, p. 69), is treated in a goods-to-liquor ratio of 1:40 in a bath which contains, per liter, 2 grams of the compound of formula

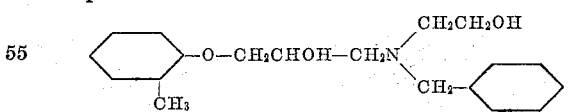

(dissolved in 4 grams of ethanol) and 2 grams of Marseilles soap (70%) as dispersing agent. The treatment is caried out in such manner that the material is entered into the bath at room temperature (20–30°), the temperature raised to 70° within 15 minues, and the material then manipulated in the bath for 20 minutes at this temperature. Thereupon, the material is rinsed and dried. In this way, there is obtained a dyeing which is very fast to gas fumes.

*Example 8*

Acetate satin is printed with Artisil Direct Red 3BP (Schultz, Farbstofftabellen, Erg. Band I, 1934, p. 69), using a printing paste obtained as follows:

40 grams of dyestuff, 50 grams of a 40% sulfonated fatty acid ester and 50 cc. of cold water are converted into paste form. Then 620 grams of gum arabic 1:10 are stirred into the resultant paste while heating to 40–50°, after which a solution of 40 grams of the compound of the formula

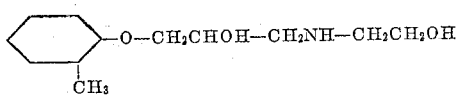

and 40 grams of warm alcohol (ethanol) are added while admixing thoroughly, and finally a solution of 30 grams of glycerine and 3 grams of sodium dibutylnaphthalene-sulfonic acid in 127 cc. of water are likewise added while stirring.

Upon printing with the resultant paste, drying and then steaming for 20 minutes, followed by rinsing and finishing, there is obtained a clear brilliant print which, in comparison with a print prepared without the aforementioned protective agent, has an essentially enhanced fastness to gas fumes.

If the said protective agent is replaced by the compound of the formula

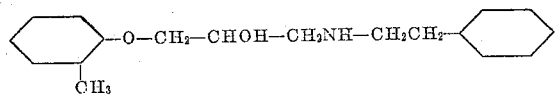

or by one of the bases set forth in the preceding examples, there are likewise obtained prints which are fast to gas fumes.

In similar manner as for acetate silk, dyed or printed films, foils and bands which are fast to gas fumes can be prepared with the aid of the above bases.

Example 9

100 parts of acetate taffeta are introduced into a cold solution of 6 parts of an oxybenzene of the formula

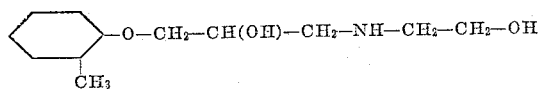

in 3000 parts of water. The temperature of the solution is raised to 82° in the course of 30 minutes while constantly moving the taffeta around, and then the temperature is maintained for 15 more minutes at this level. The thus-treated fabric is then rinsed cold and is introduced, in the moist or dry state, into a dyebath which contains a solution of 1 part of sodium 1,4-diaminoanthraquinone-2-sulfonate and 4 parts of 85% formic acid in 3000 parts of water. The dyeing is carried out at 75–80°. The dyestuff draws very well on to the treated taffeta and yields a violet dyeing which is fast to washing and of very good fastness to light.

Example 10

100 parts of desized acetate silk skein are treated after the manner described in Example 1 with a solution of 6 parts of an oxybenzene of the formula

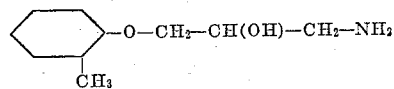

after which it is dyed in a solution of 1 part of lithium 1-amino-4-phenylaminoanthraquinone-2-sulfonate and 4 parts of 85% formic acid in 3000 parts of water. A deep blue dyeing is obtained.

Example 11

To a spinning mass of 100 parts of cellulose acetate and 1000 parts of acetone, there is added a solution of 6 parts of a mixture of the oxybenzenes of the formulae

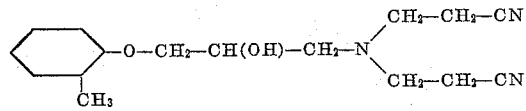

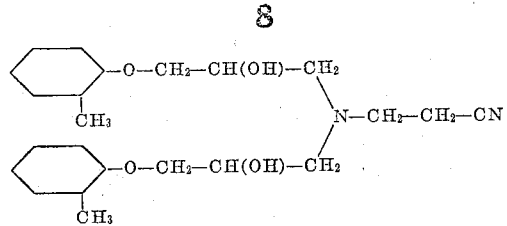

in 6 parts of acetone. Upon completion of the spinning, the resultant acetate silk is dyed in a solution of 2 parts of potassium 1,4-diaminoanthraquinone-2-sulfonate and 4 parts of 85% formic acid in 2500 parts of water. A violet dyeing of very good fastness to light is obtained, which is resistant to alkaline washing at temperatures above 70°.

Example 12

To a spinning mass of 100 parts of cellulose acetate in 1000 parts of acetone there is added a concentrated solution of 5 parts of an oxybenzene of the formula

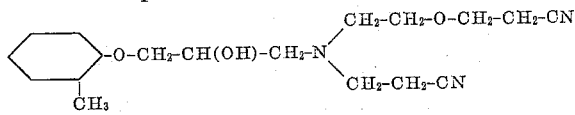

in acetone. After the mass has been thoroughly mixed and spun, an acetate silk is obtained which can be dyed at 75–80° in a dyebath consisting of 2 parts of the sodium salt of 5-sulfoacetylamino-1,9-isothiazolanthrone, 4 parts of concentrated sulfuric acid and 4000 parts of water. The so-obtained clear yellow dyeing is fast to washing and of very good fastness to light.

Example 13

100 parts of taffeta made from desized acetate silk are introduced into a cold suspension of 8 parts of an oxybenzene of the formula

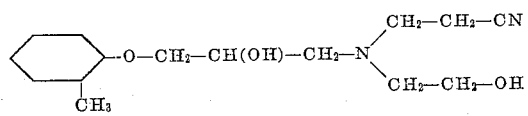

in 4000 parts of water. The suspension is heated to 80° within 30 minutes and then is maintained at this temperature for an additional 15 minutes. The cold-rinsed, dried fabric is entered into a dyebath which contains 2 parts of Roccellin (Schultz, Farbstofftabellen, No. 206), 4 parts of concentrated acetic acid and 3000 parts of water. The dyeing is carried out at a temperature of at most 80°. The fabric is dyed red, possesses good fastness to light, and is resistant to alkaline washing.

Example 14

100 parts of a desized acetate silk fabric are treated after the manner described in Example 1 with an aqueous solution of 8 parts of the hydrochloride of a hydroxybenzene of formula

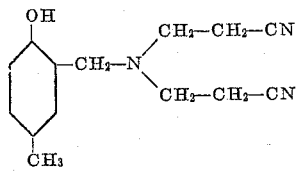

and 4000 parts of water. The dyeing obtained in an acid dyebath with 2 parts of potassium 1,4-diaminoanthraquinone-2-sulfonate is violet and of very good fastness to light.

The hydroxybenzene of this example can also be incorporated into a spinning mass by adding 5 parts thereof to a mass consisting of 100 parts of cellulose acetate in 500 parts of acetone.

Example 15

To a spinning mass of 100 parts of cellulose acetate in 800 parts of acetone, there is added a concentrated solution of 5 parts of an oxybenzene of the formula

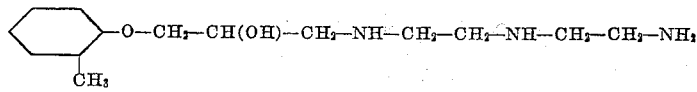

in acetone. Upon spinning the resultant mass, there is obtained a fiber which can be dyed at 80° with the dyestuff named in the preceding example. There is obtained a violet dyeing of very good fastness to light.

*Example 16*

100 parts of an acetate silk fabric are treated for 40 minutes at a temperature of at most 80° in a suspension of 8 parts of an oxybenzene of the formula

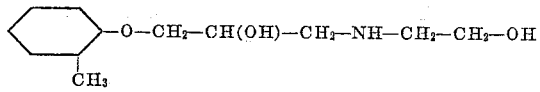

in 4000 parts of water. The rinsed and dried fabric is subjected to a cold bleaching in Javelle water which contains 2 grams of active chlorine per liter. The fabric is aftertreated with a cold mixture of 20 parts of 40% bisulfite solution and 4000 parts of water, after which it is dried, and dyed after the manner described in Example 1. A violet dyeing is obtained which has very good fastness to light.

*Example 17*

100 parts of taffeta from acetate silk are moved around at 75–80° for 45 minutes in a bath containing 8 parts of an oxybenzene of the formula

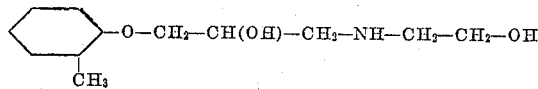

2 parts of sodium 1-amino-4-(4'-methyl)-phenylsulfonamidoanthraquinone-2-sulfonate, 4 parts of 85% acetic acid, 8 parts of an ethylene oxide-oleyl alcohol addition product containing 24 mols of ethylene oxide per mol of oleyl alcohol, and 3000 parts of water. A blue-red dyeing is obtained which is fast to light and to washing.

*Example 18*

Acetate silk dyed with 2% of 1,4-diaminoanthraquinone is treated, in a goods-to-liquor ratio of 1:40 at a temperature of 80° for 30 minutes, with a solution of 1 gram per liter of the compound of the formula

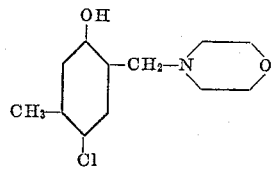

in the form of its hydrochloride or of its sodium salt. The dyeing is then rinsed and dried. The aftertreatment renders the dyeing fast to gas fumes. The thus-produced effect is resistant to a 30-minute wash with 3 grams per liter of calcined sodium carbonate and 5 grams per liter of Marseilles soap with a 72% fat content.

Aftertreatment of dyed acetate silk in a neutral bath with the compound of the formula

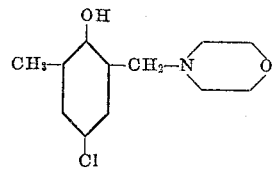

produces a similar effect.

*Example 19*

Acetate silk dyed with 2% of 1-hydroxy-4-aminoanthraquinone is treated in a goods-to-liquor ratio of 1:40 for 30 minutes at 75–80° with 2 grams per liter of the compound of the formula

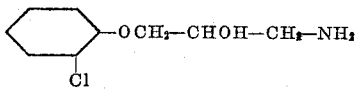

preliminarily dissolved in 50% ethanol, and is then rinsed and dried. The fastness to gas fumes of the thus-treated dyeing is greatly improved.

*Example 20*

Acetate silk dyed with 2% of 1-amino-4-anilino-anthraquinone is treated for 30 minutes in a goods-to-liquor ratio of 1:40 at a temperature of 80–85° with 2 grams per liter of the compound of the formula

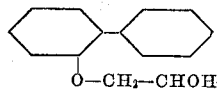

The material is then rinsed and dried. The thus-aftertreated dyeing is fast to gas fumes. This property is resistant to an alkaline wash carried out for 30 minutes with 5 grams per liter of Marseilles soap and 3 grams per liter of calcined sodium carbonate at 60°.

*Example 21*

Fabric of the type of Arnel, consisting of cellulose triacetate fibers, is dyed with 2% of 1-hydroxy-4-aminoanthraquinone and is then treated with 2 grams per liter of the compound of the formula

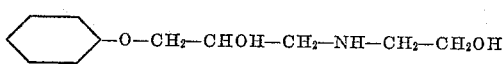

for 30 minutes at 80–100°. The aftertreated dyeing is very fast to gas fumes.

In like manner, polyamide fibers such as nylon or Perlon, dyed with the last-mentioned dyestuff, can be rendered fast to gas fumes by aftertreatment with the aforesaid compound.

*Example 22*

Acetate silk (crepe de Chine) is treated for 30 minutes at 80° in a goods-to-liquor ratio of 1:40 with 2 grams per liter of the compound of the formula

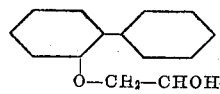

The material is then washed and dried. Upon dyeing the so-treated material with 2% of 1,4-diamino-2-sulfo-anthraquinone in an acid bath, there is obtained a level washfast, deep violet dyeing.

*Example 23*

Acetate silk dyed with 2% of 1-hydroxy-4-aminoanthraquinone is aftertreated for 30 minutes at 80–85° in a goods-to-liquor ratio of 1:40 with 2 grams per liter of the compound of the formula

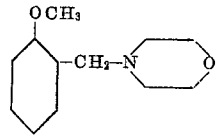

The material is then rinsed and dried; the fastness to gas fumes of the resultant dyeing is greatly enhanced.

The compound of the formula

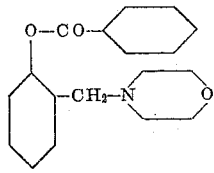

produces a similar result.

*Example 24*

Fabric made of poly-terephthalic acid glycolester is dyed at the boil with 1,4-diaminoanthraquinone. The dyeing is then aftertreated with 2 grams per liter of the compound of the formula

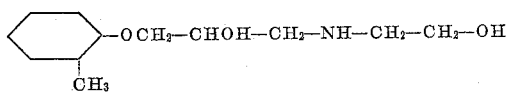

at a temperature of 80–100° for 30 minutes in a goods-to-liquor ratio of 1:40. The material is rinsed cold and then dried. The so-aftertreated dyeing has a greatly improved fastness to gas fumes.

In like manner a dyeing obtained on poly-terephthalic acid glycolester fibrous material with the aid of 1-amino-4-anilino-anthraquinone has its fastness to gas fumes improved.

Having thus disclosed the invention, what is claimed is:

1. Material selected from the group consisting of cellulose esters, polyesters and polyamides and containing an organic base of the formula $$Ar-O-CH_2CHCH_2-Am$$
$$\qquad\qquad\;\; |$$
$$\qquad\qquad\; OH$$

wherein Ar is a radical selected from the group consisting of phenyl, lower alkylphenyl, di(lower alkyl)phenyl, chlorophenyl, dichlorophenyl, chloro(lower)alkylphenyl and diphenyl, and Am stands for an at most secondary amine radical connected by its amino nitrogen atom to the $$Ar-O-CH_2CHCH_2$$
$$\qquad\qquad\; |$$
$$\qquad\qquad OH$$

group, said amine radical containing not more than 13 carbon atoms.

2. Cellulose acetate containing a compound of the formula

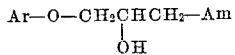

wherein $R_3$ stands for a member selected from the group consisting of hydrogen and the hydroxyethyl and cyanoethyl radicals, and $R_4$ stands for a member selected from the group consisting of hydrogen and the benzyl, phenylethyl and cyanoethyl radicals.

3. Cellulose acetate containing a compound of the formula

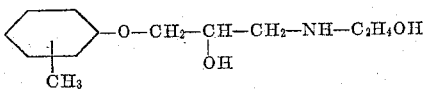

4. Cellulose acetate containing a compound for the formula

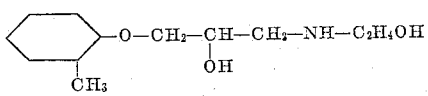

5. Cellulose acetate containing a compound of the formula

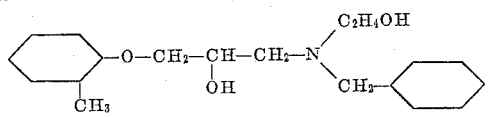

6. Cellulose acetate containing a compound of the formula

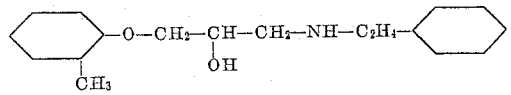

7. Cellulose acetate containing a compound of the formula

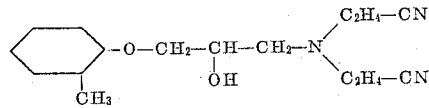

References Cited in the file of this patent

UNITED STATES PATENTS

| | | |
|---|---|---|
| 2,083,122 | Olpin et al. | June 8, 1937 |
| 2,546,167 | Salvin et al. | Mar. 27, 1951 |
| 2,619,502 | Williams et al. | Nov. 25, 1952 |
| 2,666,790 | Williams | Jan. 19, 1954 |
| 2,688,639 | Gump et al. | Sept. 7, 1954 |
| 2,691,679 | Wright et al. | Oct. 12, 1954 |
| 2,706,142 | Von Glahn | Apr. 12, 1955 |

FOREIGN PATENTS

| | | |
|---|---|---|
| 613,818 | Great Britain | Dec. 3, 1948 |

OTHER REFERENCES

Silk Journal and Rayon World for November 1945 (page 44).

British Rayon and Silk Journal for December 1951 (pages 63, 64, 66).